United States Patent
Buban (10) Patent No.: US 7,982,356 B2
(45) Date of Patent: Jul. 19, 2011

(54) ELECTRIC MOTOR AND METHOD FOR MANUFACTURING AN ELECTRIC MOTOR FOR A MOTOR VEHICLE ACTUATOR DRIVE

(75) Inventor: Tobias Buban, Gerbrunn (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 67 days.

(21) Appl. No.: 12/227,868

(22) PCT Filed: May 18, 2007

(86) PCT No.: PCT/EP2007/054829
§ 371 (c)(1),
(2), (4) Date: Jul. 16, 2009

(87) PCT Pub. No.: WO2007/141126
PCT Pub. Date: Dec. 13, 2007

(65) Prior Publication Data
US 2009/0289522 A1    Nov. 26, 2009

(30) Foreign Application Priority Data
Jun. 2, 2006    (DE) .......................... 10 2006 025 923

(51) Int. Cl.
*H02K 1/18* (2006.01)
*H02K 15/02* (2006.01)
*H02K 15/14* (2006.01)
(52) U.S. Cl. ................. 310/216.113; 310/67 R; 310/89; 310/216.118; 29/596
(58) Field of Classification Search ................ 310/67 R, 310/89, 216.113, 216.118; 29/596, 598; *H02K 1/14, H02K 1/18, 15/02, 15/14*
See application file for complete search history.

(56) References Cited

U.S. PATENT DOCUMENTS

| 2,502,121 | A | | 3/1950 | Beard | |
| 5,451,076 | A | * | 9/1995 | Burkhead | 280/766.1 |
| 5,949,169 | A | * | 9/1999 | Niimi | 310/154.43 |
| 6,498,417 | B2 | * | 12/2002 | Fuller | 310/216.113 |
| 6,741,005 | B2 | * | 5/2004 | Vohlgemuth | 310/216.045 |
| 6,856,064 | B2 | * | 2/2005 | Masumoto et al. | 310/216.008 |
| 7,064,469 | B2 | * | 6/2006 | Jack et al. | 310/216.113 |
| 2003/0127938 | A1 | * | 7/2003 | Shen et al. | 310/216 |

(Continued)

FOREIGN PATENT DOCUMENTS

CN    1502161 A    6/2004
(Continued)

OTHER PUBLICATIONS

Machine translation of JP2002142417, Akit et al., May 2002.*
(Continued)

*Primary Examiner* — Quyen Leung
*Assistant Examiner* — Terrance Kenerly
(74) *Attorney, Agent, or Firm* — Manelli Denison & Selter PLLC; Edward J. Stemberger (57) ABSTRACT

The invention relates to an electric motor and a method for manufacturing an electric motor for a motor vehicle actuator drive. The electric motor has a motor housing, a rotor assembly and a stator assembly. The stator assembly has stator teeth which are each provided with a notch in the region of their tooth back. A securing pin, which secures the stator assembly in the motor housing, is inserted into each of these notches.

9 Claims, 5 Drawing Sheets

U.S. PATENT DOCUMENTS

| | | | |
|---|---|---|---|
| 2004/0217669 A1* | 11/2004 | Fujii et al. | 310/218 |
| 2005/0200022 A1* | 9/2005 | Seto | 257/758 |
| 2006/0071574 A1 | 4/2006 | Stewart | |
| 2010/0066197 A1* | 3/2010 | Futami | 310/208 |

FOREIGN PATENT DOCUMENTS

| | | | |
|---|---|---|---|
| CN | 1571242 A | | 1/2005 |
| DE | 1973011 U | | 11/1967 |
| DE | 2936019 A | | 4/1981 |
| DE | 4321633 A1 | | 1/1995 |
| DE | 10257889 A1 | | 7/2004 |
| DE | 10261617 A1 | | 7/2004 |
| EP | 0240644 A1 | | 10/1987 |
| EP | 0957564 A2 | | 11/1999 |
| EP | 1592107 A | | 11/2005 |
| JP | 2002142417 | * | 5/2002 |
| JP | 2005304213 | * | 10/2005 |

OTHER PUBLICATIONS

Machine translation of JP2005304213, Kato et al., Oct. 2005.*

DE Office Action in Corresponding 102006025923.8 dated Apr. 16, 2007.

Office Action in co-pending Chinese Application No. CN 200780028177.0 dated Dec. 1, 2010.

* cited by examiner

FIG 8

ELECTRIC MOTOR AND METHOD FOR MANUFACTURING AN ELECTRIC MOTOR FOR A MOTOR VEHICLE ACTUATOR DRIVE

FIELD OF THE INVENTION

The invention relates to an electric motor and to a method for manufacturing an electric motor for a motor vehicle actuator drive.

BACKGROUND OF THE INVENTION

Electric motors for motor vehicle actuator drives are already known. They are used, for example, as window lifter motors, as a drive motor for adjusting the push and tilt sunroof or for assisting the steering process of a motor vehicle. A specific design of such a motor is, for example, a brushless commutated motor with an internal rotor and an electrically excited stator. Such a motor generally has a motor housing, a stator assembly which is inserted into the motor housing and has wound stator teeth, and a rotor assembly which is inserted concentrically into the motor housing, within the stator assembly. The rotor assembly includes a rotor shaft and a rotor packet which is attached to the rotor shaft. Depending on the design, the rotor assembly can also be excited electrically with windings or be equipped as a permanently excited rotor with permanent magnets. The attachment of the stator assembly in the motor housing is done in many known motors by bonding or introducing a sealing compound which, in the cured state, permanently connects the stator assembly to the motor housing. A disadvantage of attachment of the stator assembly in the motor housing by bonding or by using a sealing compound is that disassembly of the respective motor, for example for repair purposes, is not possible without damaging it.

A further possibility for the connection of a stator of an electric motor to a motor housing is shown, for example, by the German laid-open patent application DE 102 57 889 A1. In this connection, the stator is introduced coaxially into the motor housing and said motor housing engages around it. For the purpose of attachment, at least one clip is introduced between the stator and the motor housing in order to clamp the stator in the motor housing. The clips form here a tangential wedge connection of the stator to the housing.

The German laid-open patent application DE 102 61 617 A1 discloses an electrical machine having a housing and a stator packet which is arranged in the housing. The housing and the stator packet are clamped to one another by means of sprung clamping means. In this context, play between the housing and the stator packet which is present and which is due to fabrication is compensated by using the sprung clamping means which are arranged between the housing and the stator packet.

The insertion of clamping means between the housing wall and the stator means that the clamping means apply, as it were in a punctiform fashion, a force to the housing wall in a radial direction. As a result, there is the risk of the housing wall and surface of the stator being pressed apart from one another and of a gap forming between them. The housing wall is frequently provided to guide the magnetic flux as part of the stator yoke. In this case, air gaps which are produced between the housing wall and the stator are very disruptive. The transfer of heat from the stator to the housing and from there to the outside is also impeded by air gaps between the stator and the housing, and this in turn has an adverse effect on the power of the electric motor.

SUMMARY OF THE INVENTION

The object of the invention is accordingly to specify an electric motor and a method for manufacturing an electric motor for a motor vehicle actuator drive which ensure that the stator assembly is reliably secured in the motor housing, and which also permit dismounting of the motor without damage to the individual assemblies, but at the same time gaps are to be reliably prevented from forming between the stator assembly and the housing wall.

The electric motor according to the invention for a motor vehicle actuator drive has a motor housing and a rotor assembly which is inserted into the motor housing. Wherein the rotor assembly has a rotor packet which is attached to a rotor shaft. A stator assembly, which has a plurality of stator teeth, is inserted into the motor housing, wherein at least one stator tooth has, in the region of its tooth back, a notch into which a securing pin is inserted.

The notch and the securing pin which is inserted into the notch interact in such a way that forces act on the stator assembly in the tangential direction, as a result of which the external circumference of the stator assembly is widened in its entirety, and as a result forces act in turn on the motor housing in the radial direction, as a result of which the stator assembly is secured in the motor housing.

Advantageous refinements and developments of the invention are given in the dependent claims.

The advantages of the invention consist in particular in the fact that a damaged electric motor can, when necessary, be disassembled quickly and easily and, if appropriate, repaired without additional damage occurring or assemblies being broken up in the process. Furthermore, the invention ensures that the stator assembly is secured in the housing of the electric motor in a way which is fixed with respect to displacement and rotation. Inserting securing pins into notches, provided for them, in outer regions of tooth backs of individual stator teeth causes the stator assembly to be pressed uniformly in the radial direction against the inner face and therefore to be clamped to the surrounding motor housing over the entire circumference of the stator without the formation of a gap between the stator assembly and the housing wall.

Owing to the use of notches in the stator teeth which are not equipped with securing pins, a tolerance compensation is brought about which is based on the fact that the stator teeth which are not provided with securing pins have properties which are slightly sprung in their radially outer regions.

DESCRIPTION OF THE DRAWINGS

Further advantageous properties of the invention emerge from their exemplary explanation on the basis of the figures, of which.

Identical subject matters and functional units are denoted by the same reference symbols in all the figures.

DETAILED DESCRIPTION OF THE PREFERRED EMBODIMENTS

According to one embodiment, the stator assembly has a stator core which is formed continuously over the circumference, has a closed outer contour and is equipped with a large number of inwardly directed stator teeth. Such a stator core can be embodied integrally as a solid component. However, it is preferably built up from a plurality of layers of thin laminated punched parts as a laminated stator packet.

Figure 7:
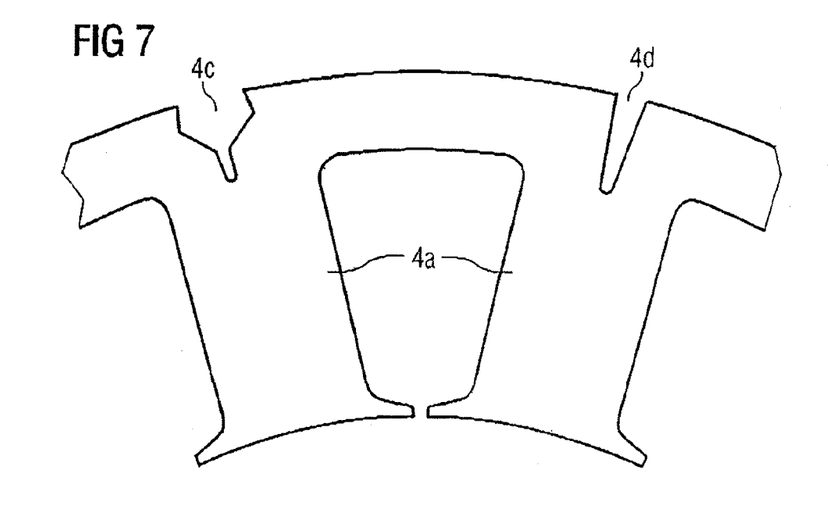
FIG. 7 shows an enlarged illustration showing a stator assembly according to a second embodiment.

FIG. 7 shows an enlarged illustration of a detail of a stator core 4i showing a stator assembly 4 according to this embodiment. The stator teeth 4a each have different notches 4c and 4d, respectively, in the region of their tooth back. The stator teeth 4a which have a recess 4c into which a securing pin 5 is to be inserted are arranged at regular intervals in the circumferential direction of the stator core 4i or of the stator assembly 4. Given a number of three securing pins 5, a distance of 120° is produced between each of the individual securing pins 5.

Figure 1:
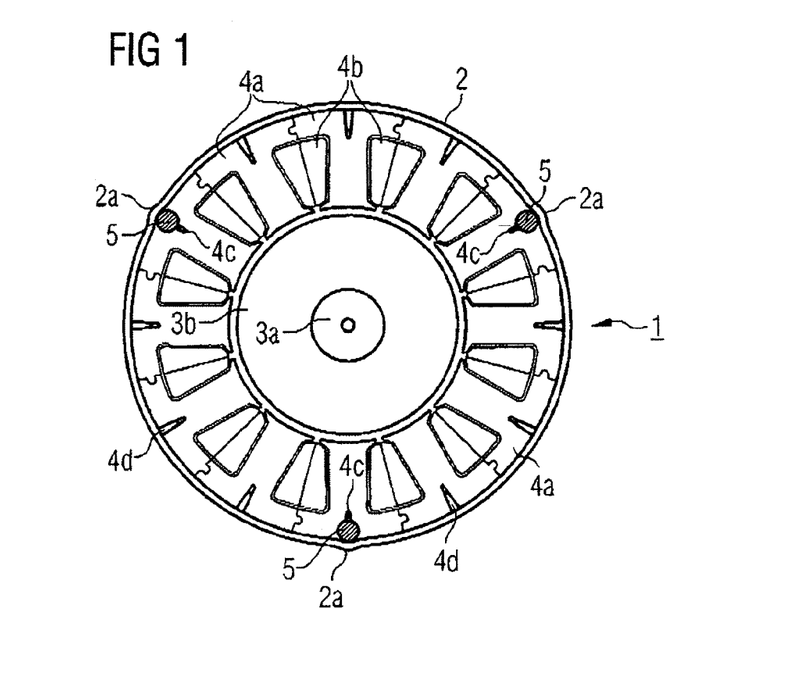
FIG. 1 is a cross-sectional illustration of an electric motor according to the invention.

FIG. 1 shows a cross-sectional illustration of an exemplary electric motor according to the invention. The illustrated motor 1 has a motor housing 2 into which a stator assembly and a rotor assembly are inserted. The rotor assembly includes a rotor shaft 3a and a rotor packet 3b which is connected in a rotationally fixed fashion to the rotor shaft. The stator assembly has stator teeth 4a and a stator winding 4b. Furthermore, each of the stator teeth is provided with a notch in the outer region of its tooth back facing the inner face of the motor housing. This notch is provided centrally with respect to the tooth in the respective tooth back. Some of these notches are denoted by the reference number 4c. These notches 4c are notches which are made comparatively wide in the outer region of their opening facing the motor housing 2. A securing pin 5 is inserted into each of these notches 4c. These securing pins 5 are alignment pins which have an oversize with respect to the notches, or said securing pins 5 are hexagon socket threaded pins which are pressed or forced or turned into the notches 4c in the axial direction after the insertion of the stator assembly into the motor housing.

In the exemplary embodiment shown in FIG. 1, a total of three securing pins 5 are provided, said securing pins 5 being pressed into notches 4c in stator teeth 4a and each being offset with respect to one another by 120° in the circumferential direction of the stator assembly. Furthermore, it is apparent from FIG. 1 that the motor housing additionally has bulges 2a in those regions in which the securing pins 5 are inserted, and the securing pins 5 are inserted into the notches 4c, arranged in the edge region of the tooth backs, of the stator teeth, in such a way that said securing pins 5 additionally engage, with part of their circumference which protrudes beyond the outer contour of the stator packet, in the bulges 2a. Depending on the given requirements, it is, of course, also possible for a smaller or larger number of securing pins to be used distributed over the circumference in other embodiments.

The insertion or pressing of the pins 5 into the notches 4c ensures that the stator assembly is secured in the motor housing in a way which is fixed with respect to displacement and rotation.

All the other stator teeth which are not provided with a securing pin preferably also have notches in the region of their tooth back. These notches are denoted by the reference number 4d in FIG. 1. The outer regions of these notches 4d are made narrower than the outer regions of the notches 4c. The arrangement of these notches 4d has the advantage that the stator teeth which are equipped with the notches 4d have sprung properties in their radially outer regions which are adjacent to the inner face of the motor housing 2. This causes tolerances which are possibly present to be compensated and promotes uniform pressing of the stator assembly against the motor housing.

The notches 4c and 4d are each made rounded at their radially inner end, the notch base, facing away from the motor housing. This counteracts the notching effect and has the advantage that the forces which occur when the securing pins are inserted and during later operation do not lead to the notches tearing in the notch base and therefore causing progressive splitting of the respective stator teeth.

If the securing pins 5 are, as has already been stated above, implemented in the form of hexagon socket threaded pins, later disassembly of the motor by means of a suitable tool can easily be carried out quickly by unscrewing the securing pins.

Figure 2:
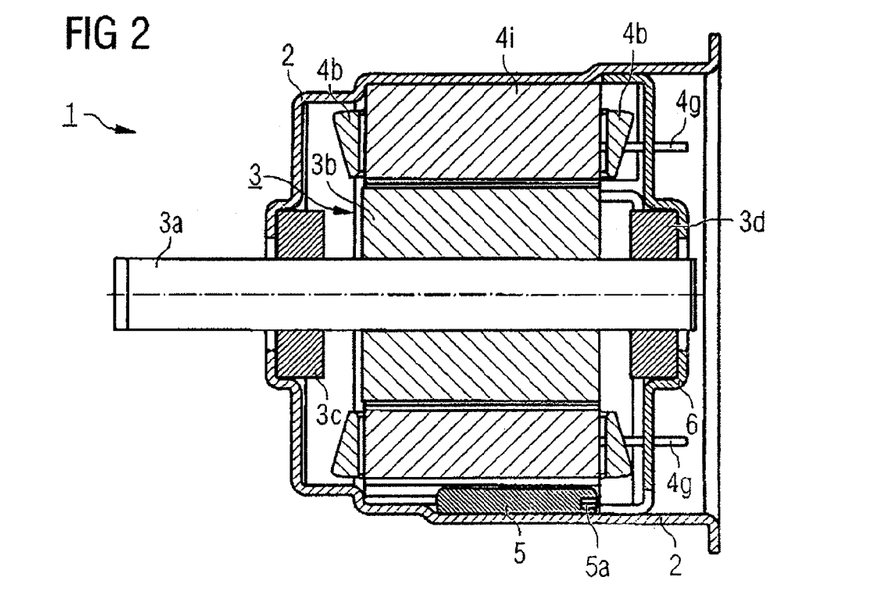
FIG. 2 is a longitudinal sectional illustration of an electric motor according to the invention.

FIG. 2 shows a longitudinal sectional illustration of an electric motor according to the invention. From this illustration it is also clear that the electric motor has a motor housing 2 in which a rotor assembly 3, which has a rotor shaft 3a and a rotor packet 3b, is inserted. Furthermore, the motor which is illustrated in FIG. 2 has a stator assembly with a stator core 4i which has stator teeth, and a stator winding 4b. The winding connections of the stator winding 4b are denoted by the reference number 4g. In addition, it is apparent from FIG. 2 that the rotor shaft 3a is rotatably mounted by means of a bearing 3c in a bearing stage of the motor housing 2, and by means of a further bearing 3d in a bearing stage of an end plate 6. Furthermore, FIG. 2 clearly shows a securing pin 5 which is inserted into a notch of a stator tooth and is positioned between the stator core 4i and the motor housing 2. The securing pin which is shown is equipped with a hexagon socket 5a, so that when necessary it can be removed quickly and easily again by means of a suitable tool.

Figure 3:
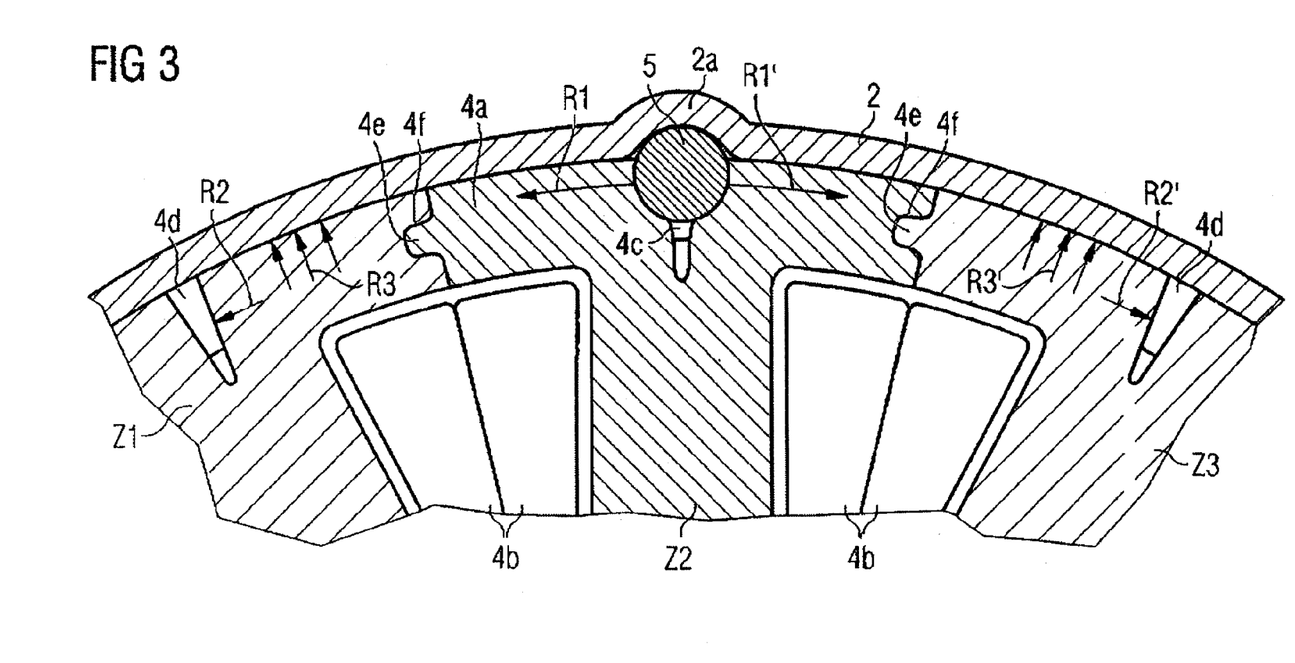
FIG. 3 is an enlarged illustration of part of the electric motor shown in FIG. 1.

FIG. 3 shows an enlarged illustration of part of the electric motor shown in FIG. 1. In this enlarged illustration it is apparent that this embodiment of the stator assembly 4 is composed of separate stator teeth 4a which are formed as individual tooth segments. Three adjacent individual tooth segments, denoted by the reference symbols Z1, Z2 and Z3, are shown in FIG. 3. The individual tooth segment Z2 arranged in the center has a notch 4c into which a securing pin 5 is inserted. The motor housing in the region of this securing pin 5 has a bulge 2a. The individual tooth segments Z1, Z2 and Z3 are each equipped with a stator winding 4b which comprises individual tooth windings in the exemplary embodiment shown.

The individual tooth segments are placed one against the other with their tooth backs in such a way that a closed, round stator is formed. In this context, the side faces, bearing one against the other, of the tooth backs each have bulges and recesses 4e/4f which engage one in the other in the manner of a tongue and groove. A bulge 4e which is provided on the left-hand side face of the tooth back of the individual tooth segment Z2 engages here in a recess 4f in the right-hand side face of the tooth back of the individual tooth segment Z1. This principle is continued with the further individual tooth segments.

The individual tooth segments Z1 and Z3 each have a notch 4d in the region of their tooth back facing the inner face of the motor housing 2. No securing pins are inserted into these notches 4d, which are narrower in the region of their opening than the notch 4c.

As a result of the insertion of the securing pin 5 into the notch 4c in the region of the tooth back of the individual tooth segment Z2, forces are applied which act in the tangential direction, as is illustrated by the directional arrows R1 and R1' in FIG. 3. These forces which act in the tangential direction are transmitted to the adjacent stator teeth and act in an overall widening fashion on the outer circumference of the stator assembly. As a result, forces which act on the motor housing in the radial direction are produced, as is shown by the arrows R3 and R3'. The radial clamping by widening by means of the tangentially acting forces has here the additional advantage that the individual tooth segments are also clamped tangentially against one another. The resulting contact pressure between the tooth segments reduces or even prevents air gaps here between the segments, and improves the magnetic flux, which has a positive effect on the power of the motor.

Since the possible widening of the circumference of the stator assembly is limited by the motor housing, an elastic compensation of the widening must take place, said compensation at the same time maintaining the contact pressure forces between the stator assembly and the motor housing. As a result of the transmission of the widening forces R1/R1' in the tangential direction, the latter act on the notches 4d which are without securing pins and which are as a result compressed in an elastically sprung fashion and therefore permit the widening to be compensated, as is illustrated by the arrows R2 and R2'. This distribution of forces ensures that the stator assembly is pressed fixedly against the motor housing 2 in the radial direction ensuring that the stator assembly is secured in the motor housing in a way which is fixed with respect to rotation and with respect to displacement.

According to this first embodiment, described above in conjunction with FIGS. 1 and 3, the stator assembly is built up with a large number of individual tooth segments.

Figure 4:
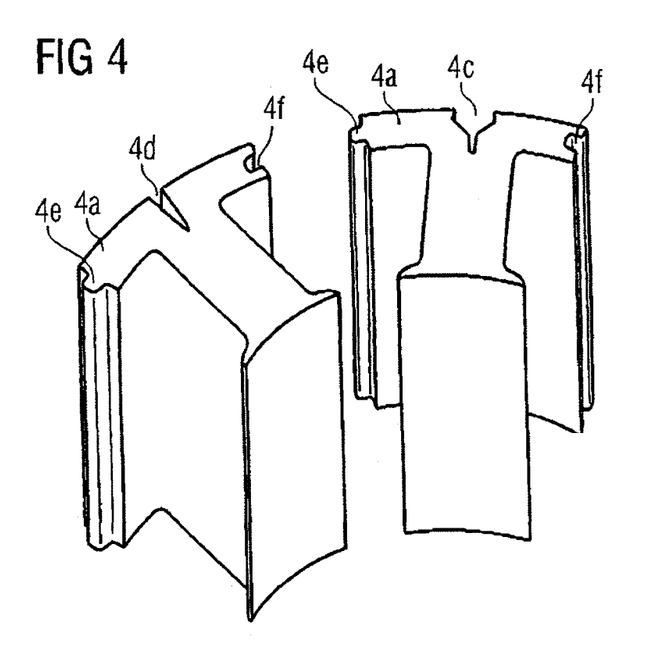
FIG. 4 shows two individual teeth of a stator assembly.

FIG. 4 shows two individual tooth segments such as are provided in the first embodiment, in a perspective illustration, individually and unwrapped. The individual tooth segment which is illustrated on the left-hand side of FIG. 4 is a segment which has, in the region of its tooth back, a notch 4d which is not provided to hold a securing pin. The individual tooth segment illustrated on the right-hand side in FIG. 4 is a segment which is equipped in the region of its tooth back with a relatively wide notch 4c, for the purpose of holding a securing pin. The bulges and recesses 4e/4f can also be clearly seen on the side faces of the tooth backs, and they engage one in the other when the individual tooth segments are joined.

Figure 5:
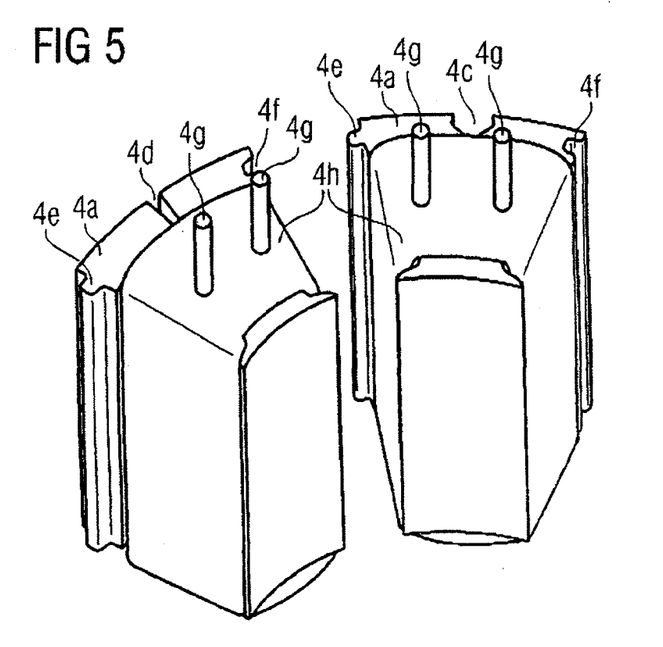
FIG. 5 shows the individual teeth, illustrated in FIG. 4, after they have been wrapped.

In a subsequent step, such as is illustrated in FIG. 5, these individual teeth are each wrapped separated with an individual tooth winding 4h. The winding connections of these windings are respectively denoted by the designation 4g in FIG. 5.

Figure 6:
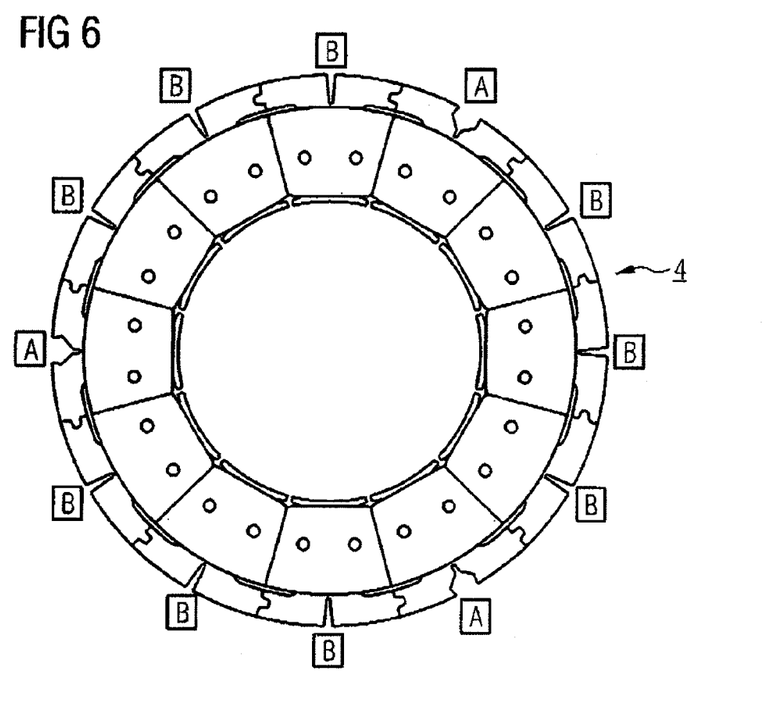
FIG. 6 shows a cross-sectional illustration of a stator assembly according to a first embodiment.

The individual tooth segments which are shown in FIG. 5 and are each provided with an individual winding 4h are combined with further individual tooth segments, each provided with a winding 4h, to form a stator assembly 4, such as is shown in FIG. 6. FIG. 6 shows a total of three individual tooth segments of the type A, and a total of nine individual tooth segments of the type B. An individual tooth segment of the type A is an individual tooth segment which is provided, in the region of its tooth back, with a notch 4c, that is to say a notch into which a securing pin 5 is inserted after the insertion of the stator assembly into the motor housing. An individual tooth segment of the type B is, in contrast, an individual tooth segment which is provided, in the region of its tooth back, with a notch 4d into which no securing pin 5 is inserted after the insertion of the stator assembly 4 into the motor housing 2.

Figure 8:
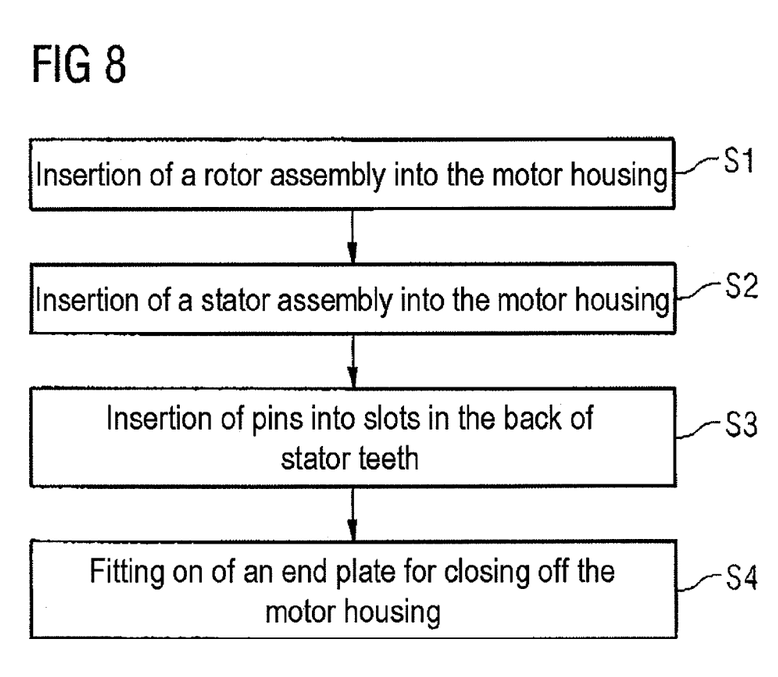
FIG. 8 shows a simplified flowchart illustrating a method for manufacturing an electric motor according to the invention.

FIG. 8 shows a flowchart illustrating a method for manufacturing an electric motor according to the invention. In a first step S1, a motor housing 2 is made available. The motor housing 2 can be embodied in the form of a pot, open on one side or in the form of a tube, open on both sides. A premounted assembly composed of a tubular housing with an end plate which is attached to an end side is also possible.

After this, in a second step S2, a stator assembly 4 is inserted into the motor housing 2 in the axial direction in accordance with the first or second embodiment described above.

If the stator assembly 4 is inserted into the motor housing 2, its attachment in the motor housing 2 is carried out in such a way that in a third step S3 a number of securing pins 5 are introduced in the axial direction into notches 4c which are provided in the region of the tooth back of individual stator teeth 4a. In this context, a total of three securing pins, which are each spaced apart from one another by 120° in the circumferential direction of the stator assembly 4, are preferably inserted.

Depending on the embodiment of the motor housing 2, it may be necessary firstly to mount an end plate with a bearing 3c for the rotor shaft 3a on an end side of the motor housing 2 in a further mounting step S3', illustrated by dashed lines in FIG. 8.

In the next mounting step S4, a rotor assembly 3, which has a rotor shaft 3a and a rotor packet 3b which is attached thereto, is inserted in the axial direction into the motor housing 2 and, if appropriate, simultaneously with the rotor shaft 3a into a first bearing 3c.

Finally, in a fifth mounting step S5, an end plate (6) is fitted with a second bearing (3d) for the rotor shaft (3a) onto the end side, lying opposite the first end plate or a housing pot base, of the motor housing (2).

The foregoing description is illustrative of the preferred embodiments only and is not to be considered limiting. As various alternatives, modifications and variations of the present invention will occur to those skilled in the art, it will be understood that the present invention extends fully to such equivalents and is to be limited in the scope only as recited in the appended claims, and structural and functional equivalents thereof.

The invention claimed is:
1. An electric motor for a motor vehicle actuator drive, comprising:
   a motor housing,
   a rotor assembly which is inserted into the motor housing and which has a rotor packet which is attached to a rotor shaft, and
   a stator assembly which is inserted into the motor housing and has stator teeth,
   wherein at least one stator tooth has, in the region of its tooth back, a notch into which a securing pin is inserted, and wherein the notch and the securing pin which is inserted into the notch interact in such a way that forces act on the stator assembly in the tangential direction, as a result of which an external circumference of the stator assembly is widened in its entirety, and as a result forces act in turn on the motor housing in a radial direction, as a result of which the stator assembly is secured in the motor housing, wherein further stator teeth of the stator assembly also have, in the region of their tooth back, a notch which is not provided for receiving a securing pin but is constructed and arranged to provide a spring property to the stator tooth.

2. The electric motor of claim 1, wherein the stator assembly has three stator teeth which have a notch and a securing pin which is inserted therein, wherein the stator teeth are each offset with respect to one another by 120° in the circumferential direction of the stator assembly.

3. The electric motor of claim 2, wherein the securing pins are alignment pins which have an oversize over the notches, as a result of which a clamping effect is generated between the stator assembly and the motor housing.

4. The electric motor of claim 2, wherein the securing pins are hexagon socket threaded pins.

5. The electric motor of claim 1, wherein the stator assembly has a stator core which has stator teeth and is continuous in the circumferential direction.

6. The electric motor of claim 1, wherein the stator assembly has a stator core which is composed of individual toothed segments.

7. The electric motor of claim 2, wherein the motor housing is equipped with bulges in a region of its internal circumference, in those regions in which the securing pins are inserted, and the securing pins are inserted into the notches of the stator teeth in such a way that they engage, with part of their circumference which protrudes beyond an outer contour of a stator packet, into the bulges.

8. A method for manufacturing an electric motor for a motor vehicle actuator drive comprising:
  inserting a stator assembly, having stator teeth, wherein at least one stator tooth has, in the region of its tooth back, a notch into which a securing in can be inserted, and wherein further stator teeth of the stator assembly also have, in the region of their tooth back, a notch which is not provided for receiving a securing in but is constructed and arranged to provide a spring property to the stator tooth, in an axial direction into a motor housing,
  inserting securing pins into the notches, into which securing pins can be inserted, in an axial direction of the stator assembly in such a way that a notch and a securing pin interact such that forces acting in the tangential direction are applied, which forces act in an overall widening fashion on an outer circumference of the stator assembly, as a result of which, in turn, forces acting in a radial direction on the motor housing are produced and the stator assembly is secured in the motor housing,
  inserting a rotor assembly in the axial direction into the motor housing, and
  fitting an end plate in the axial direction in order to close off the motor housing.

9. The method of claim 8, wherein three securing pins, which are each spaced apart by 120° in the circumferential direction of the stator assembly, are inserted in the axial direction.

\* \* \* \* \*